(12) United States Patent
Chen et al.

(10) Patent No.: US 8,594,010 B2
(45) Date of Patent: Nov. 26, 2013

(54) APPARATUS AND METHOD FOR PHYSICAL CONTROL FORMAT INDICATOR CHANNEL (PCFICH) INFORMATION SHARING OVER RELAY BACKHAUL LINK

(75) Inventors: Wanshi Chen, San Diego, CA (US); Ravi Palanki, San Diego, CA (US); Dung Ngoc Doan, San Diego, CA (US); Aamod Dinkar Khandekar, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 339 days.

(21) Appl. No.: 12/987,491

(22) Filed: Jan. 10, 2011

(65) Prior Publication Data

US 2011/0170458 A1 Jul. 14, 2011

Related U.S. Application Data

(60) Provisional application No. 61/294,073, filed on Jan. 11, 2010.

(51) Int. Cl.
*H04B 7/14* (2006.01)
*H04W 4/00* (2009.01)

(52) U.S. Cl.
USPC .......................... 370/315; 370/329; 455/11.1

(58) Field of Classification Search
USPC ......... 370/252, 276, 277, 279, 315, 328–330; 455/7, 11.1
See application file for complete search history.

(56) References Cited

U.S. PATENT DOCUMENTS

| | | | |
|---|---|---|---|
| 2011/0026473 A1* | 2/2011 | Luo et al. | 370/329 |
| 2011/0103292 A1* | 5/2011 | Pasad et al. | 370/315 |
| 2012/0063386 A1* | 3/2012 | Park et al. | 370/315 |
| 2012/0099519 A1* | 4/2012 | Kim et al. | 370/315 |
| 2012/0269113 A1* | 10/2012 | Park et al. | 370/315 |

OTHER PUBLICATIONS

Catt: "Design of Relay Backhaul Control Channels in LTE-A", 3GPP Draft; R1094562, 3rd Generation Partnership Project (3GPP), Mobile Competence Centre; 650, Route Des Lucioles; F-06921 Sophia-Antipolis Cedex; France, No. Jeju; 20091109, Nov. 9, 2009, XP050388977, [retrieved on Nov. 2, 2009].

(Continued)

*Primary Examiner* — Kerri Rose
(74) *Attorney, Agent, or Firm* — Michael J. DeHaemer, Jr.

(57) ABSTRACT

An apparatus and method for communicating information in a relay downlink backhaul between a base station and at least one relay node comprising: determining a first starting symbol index of at least one control channel in the relay downlink backhaul; determining a second starting symbol index of at least one data channel in the relay downlink backhaul; and communicating information using the at least one control channel based on the first starting symbol index and the at least one data channel based on the second starting symbol index in the relay downlink backhaul. In one example, the apparatus and method comprise receiving information using a control channel based on a first starting symbol index and a data channel based on a second starting symbol index in the relay downlink backhaul.

47 Claims, 10 Drawing Sheets

(56) References Cited

OTHER PUBLICATIONS

Huawei: "Using R-PCFICH like channel to indicate start position of R-PDSCH", 3GPP Draft; R1-094723 Using R-PCFICH Like Channel to Indicate Start Position of R-PDSCH, 3rd Generation Partnership Project (3GPP), Mobile Competence Centre : 650, Route Des Lucioles ; F-06921 Sophiaantipolis Cedex ; France, No. Jeju; 20091109, Nov. 9, 2009, XP050389121, [retrieved on Nov. 3, 2009].

International Search Report and Written Opinion—PCT/US2011/020889—ISA/EPO—Jul. 15, 2011.

LG-Nortel: "Control Channel Design for Relay Backhaul Link in FDM+TDM Scheme", 3GPP Draft; R1-094453 Control Channel Design for Relay Backhaul Link in FDM+TDM Scheme VO.I, 3rd Generation Partnership Project (3GPP), Mobile Competence Centre ; 650, Route Des Lucioles ; F-06921 Sophia-Antipolis Cedex ; France, No. Jeju; 20091109, Nov. 9 2009, XP050388879, [retrieved on Nov. 2, 2009].

\* cited by examiner

US 8,594,010 B2

APPARATUS AND METHOD FOR PHYSICAL CONTROL FORMAT INDICATOR CHANNEL (PCFICH) INFORMATION SHARING OVER RELAY BACKHAUL LINK

CLAIM OF PRIORITY UNDER 35 U.S.C. §119

Priority is claimed to Provisional Application No. 61/294,073 entitled Apparatus and Method for PCFICH Information Sharing Over Relay Backhaul Link for LTE-A Wireless Systems filed Jan. 11, 2010, and assigned to the assignee hereof and hereby expressly incorporated by reference herein.

FIELD

This disclosure relates generally to apparatus and methods for information sharing in wireless communication systems. More particularly, the disclosure relates to Physical Control Format Indicator Channel (PCFICH) information sharing over relay backhaul link, for example, for LTE-A wireless systems.

BACKGROUND

Wireless communication systems are widely deployed to provide various types of communication content such as voice, video, data, etc. These systems may be multiple-access systems capable of supporting communication with multiple users by sharing the available system resources (e.g., bandwidth and transmit power). Examples of such multiple-access systems include code division multiple access (CDMA) systems, time division multiple access (TDMA) systems, frequency division multiple access (FDMA) systems, $3^{rd}$ Generation Partnership Project (3GPP) Long Term Evolution (LTE) systems, and orthogonal frequency division multiple access (OFDMA) systems.

In general, a wireless multiple-access communication system can simultaneously support communication for multiple wireless terminals. Each terminal communicates with one or more base stations via transmissions on the forward and reverse links. The forward link (or downlink) refers to the communication link from the base stations to the terminals, and the reverse link (or uplink) refers to the communication link from the terminals to the base stations. This communication link may be established via a single-input single-output (SISO), multiple-input single-output (MISO) or a multiple-input multiple-output (MIMO) system.

SUMMARY

Disclosed is an apparatus and method for communicating information in a relay downlink backhaul between a base station and at least one relay node. According to one aspect, a method for communicating information in a relay downlink backhaul between a base station and at least one relay node comprising determining a first starting symbol index of at least one control channel in the relay downlink backhaul; determining a second starting symbol index of at least one data channel in the relay downlink backhaul; and communicating information using the at least one control channel based on the first starting symbol index and the at least one data channel based on the second starting symbol index in the relay downlink backhaul.

According to another aspect, a method for communicating information in a relay downlink backhaul between a base station and at least one relay node comprising receiving information using at least one control channel based on a first starting symbol index and at least one data channel based on a second starting symbol index in the relay downlink backhaul, wherein the first starting symbol index is of the at least one control channel in the relay downlink backhaul and the second starting symbol index is of the at least one data channel in the relay downlink backhaul.

According to another aspect, an apparatus for communicating information in a relay downlink backhaul between a base station and at least one relay node, the apparatus comprising a processor and a memory with the memory containing program code executable by the processor for performing the following: determining a first starting symbol index of at least one control channel in the relay downlink backhaul; determining a second starting symbol index of at least one data channel in the relay downlink backhaul; and communicating information using the at least one control channel based on the first starting symbol index and the at least one data channel based on the second starting symbol index in the relay downlink backhaul.

According to another aspect, an apparatus for communicating information in a relay downlink backhaul between a base station and at least one relay node, the apparatus comprising a processor and a memory with the memory containing program code executable by the processor for performing the following: receiving information using at least one control channel based on a first starting symbol index and at least one data channel based on a second starting symbol index in the relay downlink backhaul, wherein the first starting symbol index is of the at least one control channel in the relay downlink backhaul and the second starting symbol index is of the at least one data channel in the relay downlink backhaul.

According to another aspect, an apparatus for communicating information in a relay downlink backhaul between a base station and at least one relay node comprising determining a first starting symbol index of at least one control channel in the relay downlink backhaul; determining a second starting symbol index of at least one data channel in the relay downlink backhaul; and communicating information using the at least one control channel based on the first starting symbol index and the at least one data channel based on the second starting symbol index in the relay downlink backhaul.

According to another aspect, an apparatus for communicating information in a relay downlink backhaul between a base station and at least one relay node comprising receiving information using at least one control channel based on a first starting symbol index and at least one data channel based on a second starting symbol index in the relay downlink backhaul, wherein the first starting symbol index is of the at least one control channel in the relay downlink backhaul and the second starting symbol index is of the at least one data channel in the relay downlink backhaul.

According to another aspect, a non-transitory computer-readable medium storing a computer program, wherein execution of the computer program is for: determining a first starting symbol index of at least one control channel in the relay downlink backhaul; determining a second starting symbol index of at least one data channel in the relay downlink backhaul; and communicating information using the at least one control channel based on the first starting symbol index and the at least one data channel based on the second starting symbol index in the relay downlink backhaul.

According to another aspect, a non-transitory computer-readable medium storing a computer program, wherein execution of the computer program is for: receiving information using at least one control channel based on a first starting symbol index and at least one data channel based on a second starting symbol index in a relay downlink backhaul, wherein the first starting symbol index is of the at least one control channel in the relay downlink backhaul and the second starting symbol index is of the at least one data channel in the relay downlink backhaul.

Advantages of the present disclosure may include increase bandwidth efficiency in sharing information, for example, between network nodes.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

Figure 1:
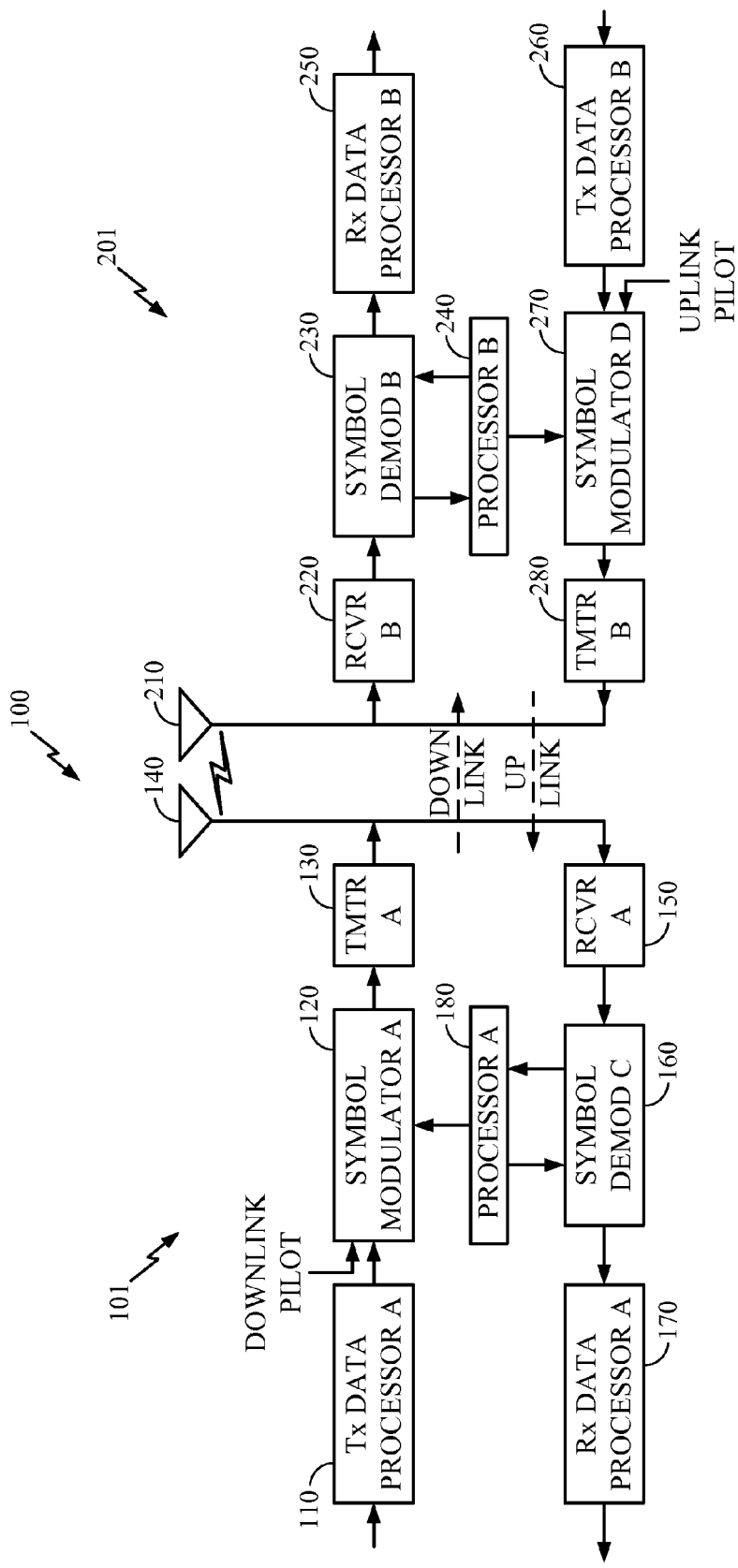
FIG. 1 is a block diagram illustrating an example of a wireless communication system.

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), cdma2000, etc. UTRA includes Wideband-CDMA (W-CDMA) and Time Division Synchronous Code Division Multiple Access (TD-SCDMA) (a.k.a. Low Chip Rate (LCR)). Cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). Long Term Evolution (LTE) is a release of UMTS that uses E-UTRA. UTRA, E-UTRA, GSM, UMTS and LTE are described in documents from an organization named "3rd Generation Partnership Project" (3GPP). cdma2000 is described in documents from an organization named "3rd Generation Partnership Project 2" (3GPP2). These various radio technologies and standards are known in the art. For clarity, certain aspects of the techniques are described below for LTE or LTE-A, and LTE or LTE-A terminology may be used the description without intention of limiting the scope or spirit of the present disclosure to only LTE or LTE-A systems.

FIG. 1 is a block diagram illustrating an example of a two terminal system 100. One skilled in the art would understand that the example two terminal system 100 illustrated in FIG. 1 may be implemented in an FDMA environment, an OFDMA environment, a CDMA environment, a WCDMA environment, a TDMA environment, a SDMA environment or any other suitable wireless environment.

In one aspect, the two terminal system 100 includes an access node 101 (e.g., base station, Node B or eNodeB) and a user equipment or UE 201 (e.g., user device). In the downlink leg, the access node 101 (e.g., base station, Node B or eNodeB) includes a transmit (TX) data processor A 110 that accepts, formats, codes, interleaves and modulates (or symbol maps) traffic data and provides modulation symbols (e.g., data symbols). The TX data processor A 110 is in communication with a symbol modulator A 120. The symbol modulator A 120 accepts and processes the data symbols and downlink pilot symbols and provides a stream of symbols. In one aspect, it is the symbol modulator A 120 that modulates (or symbol maps) traffic data and provides modulation symbols (e.g., data symbols). In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 (e.g., user device) includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (e.g., data symbols) outputted from the receiver unit B 220. One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), deinterleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 (e.g., user device) includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 (e.g., user device) is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node 101 (e.g., base station, Node B or eNodeB) and at the UE 201 (e.g., user device), respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the two terminal system 100 is a multiple-access system. For a multiple-access system (e.g., frequency division multiple access (FDMA), orthogonal frequency division multiple access (OFDMA), code division multiple access (CDMA), time division multiple access (TDMA), space division multiple access (SDMA), etc.), multiple terminals transmit concurrently on the uplink leg, allowing access to a plurality of UEs (e.g., user devices). In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

Figure 2:
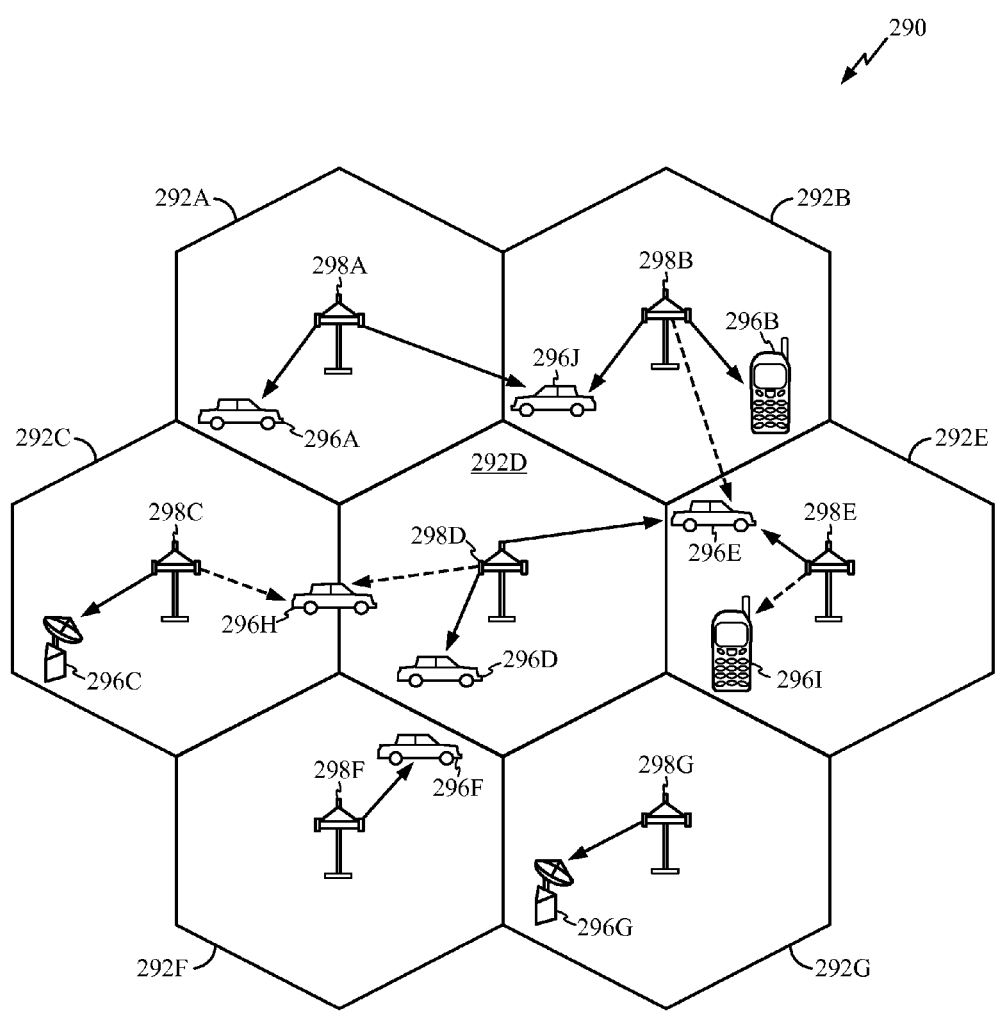
FIG. 2 illustrates an example of a wireless communications system that supports a plurality of user devices.

FIG. 2 illustrates an example of a wireless communications system 290 that supports a plurality of user devices. In FIG. 2, reference numerals 292A to 292G refer to cells, reference numerals 298A to 298G refer to base stations (BS), node Bs or eNodeBs and reference numerals 296A to 296J refer to access user devices (a.k.a. user equipments (UE)). Cell size may vary. Any of a variety of algorithms and methods may be used to schedule transmissions in system 290. System 290 provides communication for a number of cells 292A through 292G, each of which is serviced by a corresponding base station 298A through 298G, respectively.

In one aspect, LTE-Advanced (LTE-A) is a next generation wireless technology evolution in the UMTS protocol family. Desired goals for LTE-A systems include enhanced data rates, up to 1 Gb/s on the downlink, for example. In addition, deployment of LTE-A wireless systems must be backward-compatible with LTE systems to preserve the financial investments made in the preceding LTE infrastructure. Furthermore, another goal for LTE-A systems is improved spectral efficiency, that is, a higher data throughput per unit bandwidth, expressed in bits per second per Hertz (bps/Hz). Improved spectral efficiency is vital to the growth of the wireless communication industry since the available spectral resources for wireless transmission are severely limited and tightly regulated worldwide.

In the present disclosure the first deployment of LTE will be referred to as LTE Release 8 (Rel-8). At present, a modified LTE version is known as LTE Release 9 (Rel-9). A subsequent upgrade of LTE Release 8/9 is referred to, in the present disclosure, as either LTE-Advanced (LTE-A) or LTE Rel-10+. In the present disclosure, the "10+" reference denotes a "Release 10" version or a later version. One skilled in the art would understand that the scope and spirit of the present disclosure is applicable to future upgrades of LTE with the applicable characteristics described herein, regardless of the name assigned to any future upgrade versions.

One proposed feature in LTE-A is known as carrier extension. In this aspect, individual component carriers may be extended to provide a wider bandwidth, up to, for example, 100 MHz.

In one aspect, user equipment (UE) compatible with LTE-A may have a different allocation of system bandwidth than UEs compatible only with LTE Rel-8 due to the usage of carrier extension. Resource assignments and other control data for the LTE Rel-8 or LTE-A downlinks are carried in a message known as the Downlink Control Information (DCI).

In many telecommunication systems, communications networks are used to exchange messages among several interacting spatially-separated devices. The various types of networks may be classified in different aspects. In one example, the geographic scope of the network could be over a wide area, a metropolitan area, a local area, or a personal area, and the corresponding networks would be designated as wide area network (WAN), metropolitan area network (MAN), local area network (LAN), or personal area network (PAN). Networks also differ in the switching/routing technique used to interconnect the various network nodes and devices (e.g. circuit switching vs. packet switching), in the type of physical media employed for transmission (e.g. wired vs. wireless), or in the set of communication protocols used (e.g. Internet protocol suite, SONET (Synchronous Optical Networking), Ethernet, etc.).

One important characteristic of communications networks is the choice of wired or wireless media for the transmission of electrical signals among the constituents of the network. In the case of wired networks, tangible physical media such as copper wire, coaxial cable, fiber optic cable, etc. are employed to propagate guided electromagnetic waveforms which carry message traffic over a distance. Wired networks are a static form of communications networks and are typically favored for interconnection of fixed network elements or for bulk data transfer. For example, fiber optic cables are often the preferred transmission media for very high throughput transport applications over long distances between large network hubs, such as, bulk data transport across or between continents over the Earth's surface.

On the other hand, wireless networks are often preferred when the network elements are mobile with dynamic connectivity needs or if the network architecture is formed in an ad hoc, rather than fixed, topology. Wireless networks employ intangible physical media in an unguided propagation mode using electromagnetic waves in the radio, microwave, infrared, optical, etc. frequency bands. Wireless networks have the distinct advantage of facilitating user mobility and rapid field deployment compared to fixed wired networks. However, usage of wireless propagation requires significant active resource management among the network users and high levels of mutual coordination and cooperation for compatible spectrum utilization.

In one example, wireless networks are compatible with various wireless protocols. Exemplary versions of wireless protocols include Universal Mobile Telecommunications System (UMTS), High Speed Downlink Packet Access (HSDPA), High Speed Uplink Packet Access (HSUPA), Long Term Evolution (LTE), etc. Wireless systems compliant with these protocols are used for various communication services such as telephony, messaging, data transfer, emails, Internet access, audio broadcasts, video communications, etc. These wireless systems generally utilize an access node (AN), also known as base station (BS), Node B or eNodeB, to connect to an individual access terminal (AT), also known as user equipment (UE) or user device, to fixed telecommunications infrastructure networks. In general, a radio coverage area is implemented using a plurality of Node Bs using a cellular-based topological architecture to provide wireless access, also known as an air interface, to the UEs (e.g., user devices). Examples of fixed telecommunications infrastructure networks include the public switched telephony network (PSTN), Internet, private data networks, etc. In one aspect, the Node Bs may be connected to a Radio Network Controller (RNC) to facilitate the interconnection to the fixed telecommunications infrastructure networks.

LTE is an evolution of the UMTS wireless communication standard developed by the Third Generation Partnership Project (3GPP), commencing with Release 8 (Rel-8) of the UMTS protocol family. The LTE physical layer is based on orthogonal frequency division multiplex (OFDM) on the downlink, i.e. from base station or eNodeB to user equipment (UE) and single carrier frequency division multiple access (SC-FDMA) on the uplink, i.e. from the UE to the base station or eNodeB. LTE may also accommodate multiple input multiple output (MIMO) antenna techniques for improved spectral efficiency.

LTE-Advanced (LTE-A) is a further evolution of LTE, currently slated for UMTS Release 10 (Rel-10). Under study for LTE-A are various system enhancements to improve system performance such as cellular coverage, system throughput, quality of service (QoS), etc. One improvement under consideration is the usage of relays in the LTE air interface to provide extended radio coverage for more users. In one aspect, relays are used to minimize the distance between a transmitter and a receiver to enable higher data rates or improved communications performance. In another aspect, there are several relay architectural alternatives. For example, one form of relay is known as a layer 3 relay or a self-backhaul which effectively appears as another base station or eNodeB to a UE connected to it. Note that "layer 3" refers to the well-known open systems interconnection (OSI) protocol stack model, where layer 3 is also referred to as the "network layer".

Figure 3:
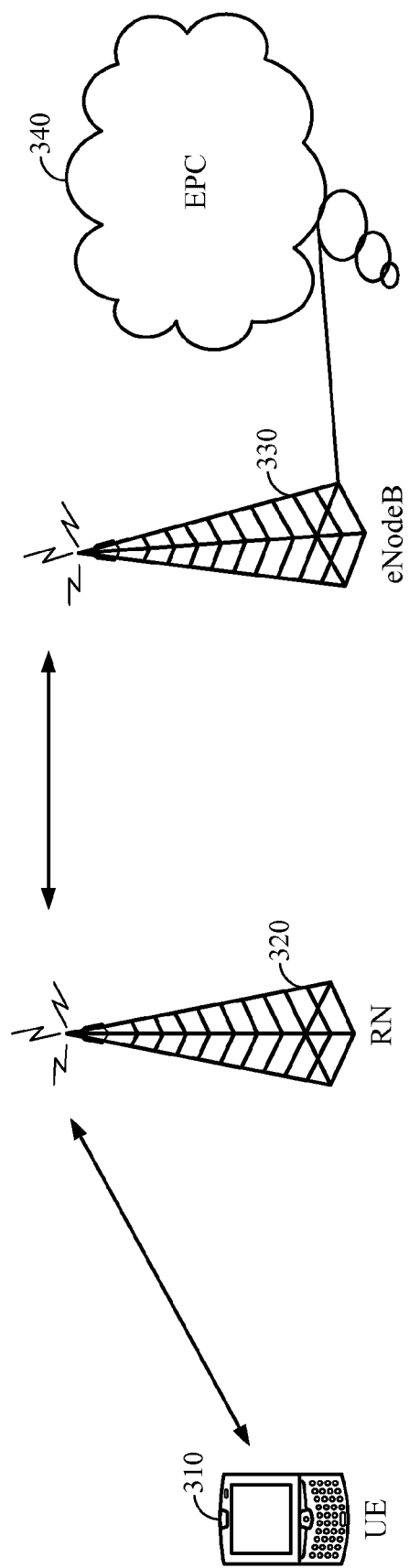
FIG. 3 illustrates an example of a relay architecture in a LTE wireless communication system.

FIG. 3 illustrates an example of a relay architecture in a LTE wireless communication system. In one example, a user equipment (UE) 310 is a communications device that a user employs for personal communication services. In one aspect, the UE has an air interface or wireless connection to a relay node (RN) 320, which in turn is wirelessly connected to a base station or eNodeB 330. In the relay context, this eNodeB is also referred to a donor cell. Next, the eNodeB is connected to the evolved packet core (EPC) 340. The EPC provides the network infrastructure to connect the various users of the wireless system to fixed telecommunications assets such as the Public Switched Telephony Network (PSTN), Internet, private data networks, virtual private networks (VPNs), etc. In one example, the EPC is an all-Internet Protocol (IP)-based core network with radio access through well-defined air interfaces.

In one aspect, the wireless connection between the UE and relay node (RN) is known as an access link. In another aspect, the wireless connection between the RN and eNodeB is known as a backhaul link.

In one aspect, the relay node (RN) employs inband, half-duplex, frequency division duplex (FDD) communications. Inband refers to the usage of the same spectral resources as the user wireless links, both downlink and uplink. Half-duplex is a transmission mode for a communications device which sequentially alternates between transmitting and receiving (i.e. one-way communications at a time), unlike full-duplex mode which allows simultaneous or virtually simultaneous two-way communications at a time. FDD is a duplexing technique which uses separate frequency bands for the opposite directions of duplex communication, i.e. the downlink is on one frequency band and the uplink is on another frequency band.

In another aspect, LTE systems use sounding reference signals (SRS) to support uplink channel estimation for improved uplink resource allocation. In one example, a UE transmits a SRS uplink to an eNodeB as part of its uplink transmission format.

Figure 4:
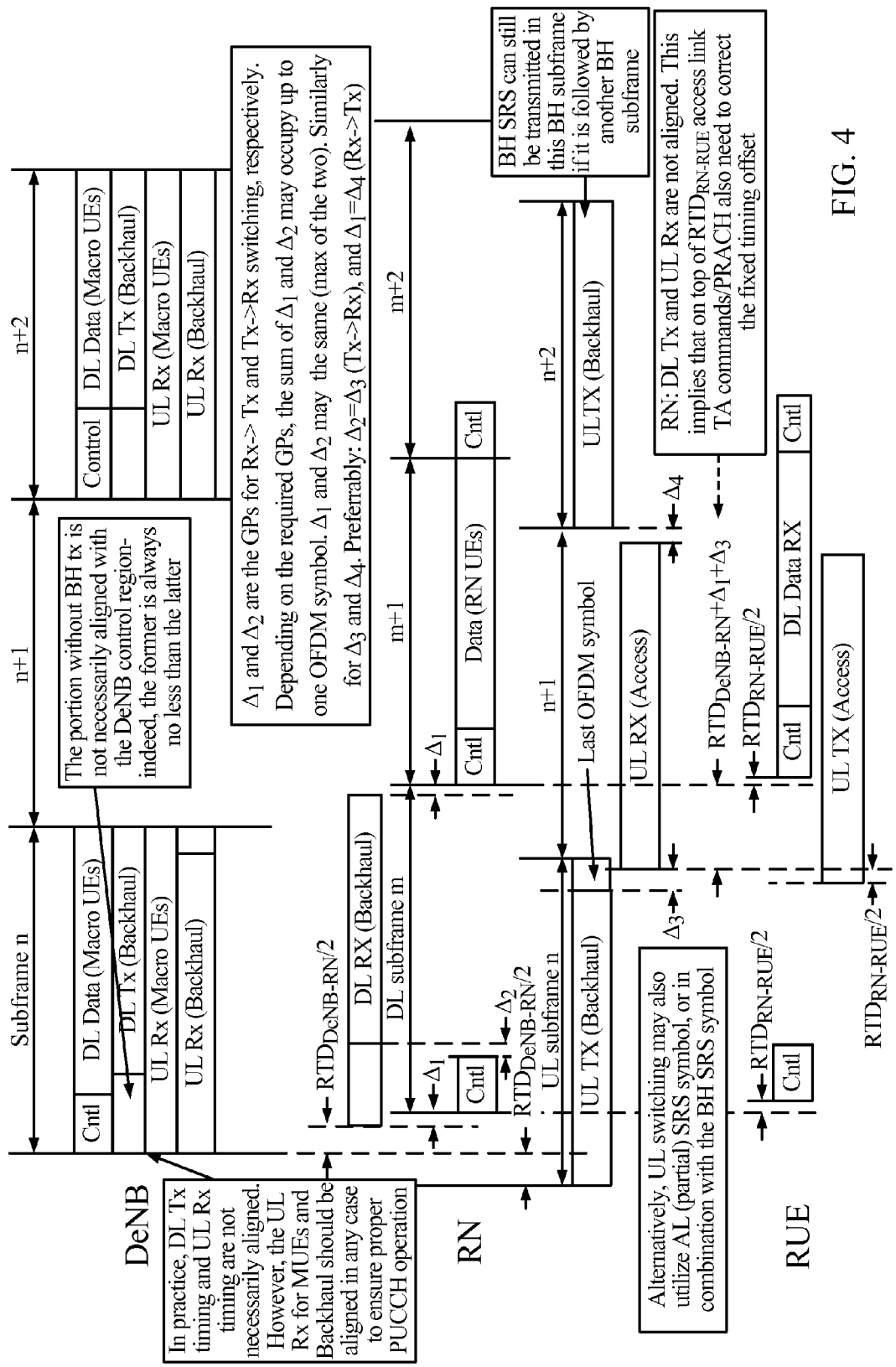
FIG. 4 illustrates an example of a relay backhaul timeline.
Figure 5:
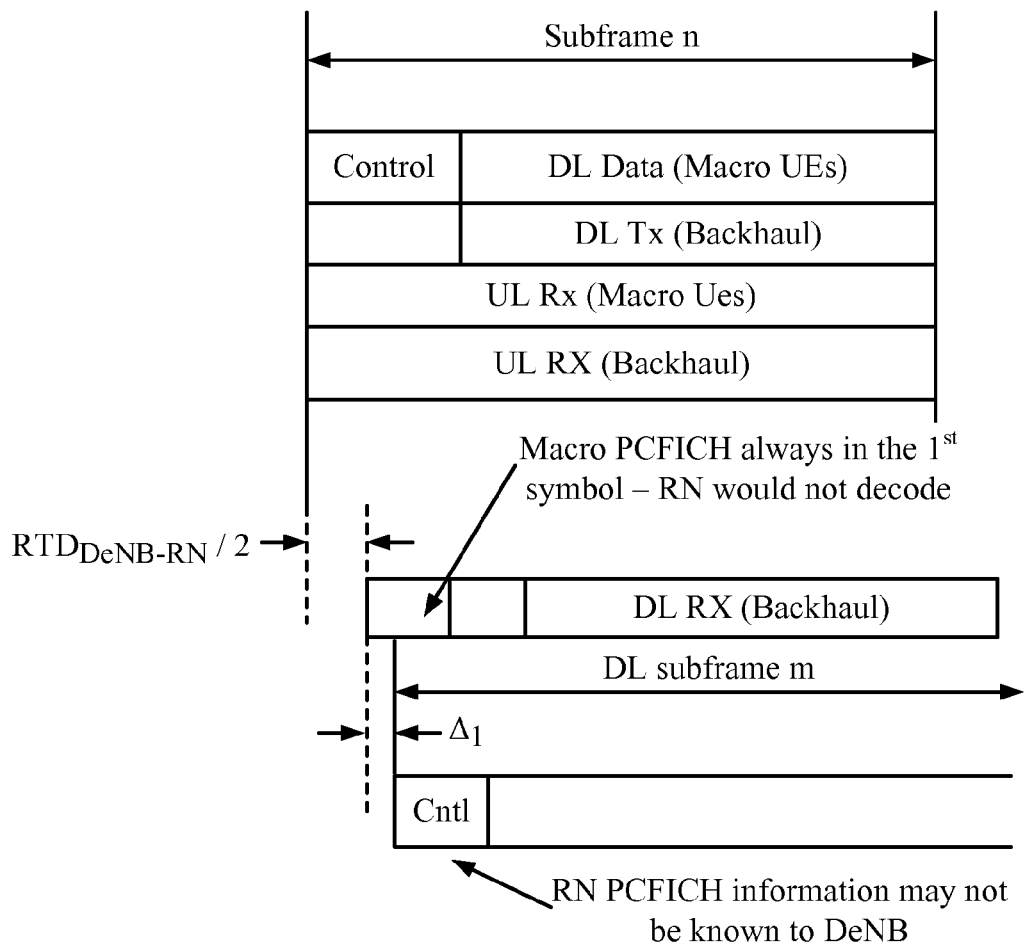
FIG. 5 illustrates an example of a relay backhaul timeline.

FIG. 4 illustrates an example of a relay backhaul timeline. FIG. 5 illustrates an example of a relay backhaul timeline. Shown are various events for successive subframes for a donor eNodeB (DeNB), a relay node (RN), and a remote user equipment (RUE).

In one aspect, LTE systems include a control channel known as physical control format indication channel (PCFICH). In one aspect, PCFICH is used to inform a UE of the number of control symbols (1, 2, or 3) used for the PDCCH in a subframe. For example, the number of control symbols equal to 1, 2 or 3 is used for large system bandwidths >10 RBs. Otherwise, 2, 3 or 4 control symbols are used for a system bandwidth of 6-10 RBs. In one aspect, PCFICH has 32 bits. The PCFICH itself carries 2-bit information but is mapped to 16 resource elements. In another aspect, the control symbols are OFDM symbols.

In one aspect, PCFICH information is not mutually available, by default. For example, the values for PCFICH range from 1 to 3 for large bandwidths or from 2 to 4 for small bandwidths. In the case of a multicast/broadcast single frequency network (MBSFN), the PCFICH values may be 1 or 2 for one or two transmitters and large bandwidths, or may be 2 otherwise. In another aspect, for the backhaul subframes, a RN always uses MBSFN subframes. Moreover, a donor eNodeB could be MBSFN or non-MBSFN.

In one aspect, if there is no mutual PCFICH information, various elements of the wireless system may assume a fixed PCFICH value. For example, from a RN perspective, in a non-MBSFN architecture, there are always 3 control symbols for large bandwidths or 4 control symbols for small bandwidths in a donor eNodeB. In another example, in a MBSFN architecture, there are always 2 control symbols for all bandwidths. In one example, the third symbol cannot be used for the backhaul link. For example, from a donor eNodeB perspective with one or two transmitters and large bandwidth, there are always 2 control symbols. Note that, in one aspect, if one control symbol were used, PHICH duration broadcasting could be impacted. Table 1 illustrates the number of symbols available for R-PDSCH/R-PDCCH.

TABLE 1

| Cases | Number of symbols for R-PDSCH/R-PDCCH |
|---|---|
| Large BWs, DeNB non-MBSFN/MBSFN | 11 |
| Small BWs, DeNB non-MBSFN | 10 |
| Small BWs, DeNB MBSFN | 11 |

In one aspect, the RN needs at least one control symbol and potentially another symbol for switching. In one example, let N denote the total number of symbols and M the number of control symbols. Then, if the switching impact is one symbol, the number of symbols available for R-PDSCH/R-PDCCH is given by:

| | | |
|---|---|---|
| 14 − max(N + 1, M) symbols | | for non-MBSFN |
| 12 symbols | for N = 1 | for MBSFN |
| 11 symbols | for large bandwidths | for MBSFN |
| 10 symbols | for small bandwidths | for MBSFN |

Alternatively, if the switching impact is negligible, the above results apply with the substitution N+1→N. In other words, by knowing that the impact is negligible, one more symbol can be saved for R-PDSCH. Such saving is applicable for various combinations of M and N.

For example, the following disclosure focuses on the assumption that the impact is one symbol. In another aspect, the maximum number of symbols available is 12 when N=1 and M=1 or 2, with a saving of one symbol. Table 2 illustrates the number of symbols available for R-PDSCH/R-PDCCH with mutual information. In particular, Table 2 illustrates the number of symbols for the non-MBSFN assumption with 14−max(N+1,M) symbols.

TABLE 2

| | # of symbols for R-PDSCH/R-PDCCH | | | |
|---|---|---|---|---|
| | N = 1 | | N = 2 | |
| Cases | M = 1/2 | M = 3/4 | M = 1/2/3 | M = 4 |
| Large BW, non-MBSFN | 12 | 11 | 11 | N/A |
| Large BW, MBSFN | 12 | N/A | 11 | N/A |
| Small BW, non-MBSFN | N/A | N/A | 11 | 10 |
| Small BW, MBSFN | N/A | N/A | 11 | N/A |

In another aspect, assuming one symbol switching impact, savings are possible for large bandwidths only if M=1 or 2 and N=1. For the link from DeNB to RN, whether M=1 or 2 is irrelevant; one only needs to differentiate when M=3 or M<3, which implies only one bit of information is needed. For the link from RN to DeNB, only one bit of information is needed since N=1 or 2. In one example, the one bit of information may be correlated with the antenna configuration, e.g. if there are 4 transmitters, there is no need for such information. In another aspect, savings are possible for small bandwidths only if M=2 or 3 and N=2. For the link from DeNB to RN, only one bit of information is needed since M=4 or M<4 is sufficient. For the link from RN to DeNB, there is no need to report N.

In another aspect, the PCFICH information can be shared either semi-statically at layer 3 or dynamically shared at layer 2, and can be either broadcast or unicast to a RN. In one aspect, dynamic sharing provides maximum flexibility and is therefore preferred in the downlink direction, from DeNB to RN. In one example, one bit of information is embedded in R-PDCCH, indicating whether M=3 or M<3 for large bandwidths or whether M=4 or M<4 for small bandwidths. Alternatively, the one bit of information may be conveyed using the starting symbol index of R-PDSCH. For example, a 0 bit could be conveyed in the fourth symbol and a 1 bit could be conveyed in the third symbol for large bandwidths. Also, for example, a 0 bit could be conveyed in the fifth symbol and a 1 bit could be conveyed in a fourth symbol for small bandwidths. As another alternative, the one bit of information may be realized with different cyclic redundancy check (CRC) masking. In another aspect, semi-static and RN-specific sharing is preferred in the uplink direction, from RN to DeNB. In one example, one bit of information for N=1 or 2 may be indicated in a dedicated flag bit if the value of N is not expected to change dynamically for large bandwidths. In another example, no information exchange is necessary for small bandwidths.

In another aspect, the sharing of PCFICH may be either broadcast or unicast. If sharing is broadcast, for example, using R-PCFICH-like signaling, it may be unclear from the RN perspective when R-PDSCH combines M with N, as N must be propagated from RN to DeNB. In this case, an ambiguity may exist. As an alternative, unicast eliminates any ambiguity. For example, if DeNB does not yet have the information for N, R-PDCCH always can be signaled assuming N=2. Once DeNB knows the information for N, it can optimize R-PDSCH starting symbol based on M and N and indicating it to the RN. In one aspect, unicast incurs a one bit overhead for every RN, however this feature is not deemed significant. In one example, one bit of information is always present in R-PDCCH. For large bandwidths, start with M=3 and upon reception of N from RN, the DeNB should dynamically indicate M to a RN. For small bandwidths, the DeNB should also dynamically indicate M to a RN.

Figure 6:
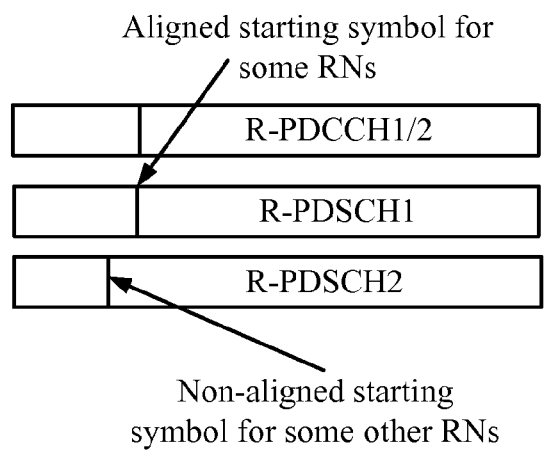
FIG. 6 illustrates an example of a symbol alignment for reverse-physical downlink control channel (R-PDCCH) and reverse-physical downlink shared channel (R-PDSCH).

In another aspect, the R-PDCCH always starts at the fourth symbol for large bandwidths or at the fifth symbol for small bandwidths, as the value of M is carried in R-PDCCH. FIG. 6 illustrates an example symbol alignment for R-PDCCH and R-PDSCH. As illustrated in FIG. 6, as R-PDCCH starts, note the following pattern for the starting symbol:

If M=1 or 2 and N=1, starts at the $3^{rd}$ symbol (large BW)
If M=3 and N=1, starts at the $4^{th}$ symbol (large BW)
If M=1 and N=2, starts at the $4^{th}$ symbol (large BW)
If M=2 or 3 and N=2, starts at the $4^{th}$ symbol (all BW)
If M=4 and N=2, starts at the $5^{th}$ symbol (small BW)

In one aspect, since R-PDCCH and R-PDSCH may start at different symbols, frequency division multiplex (FDM)-based R-PDCCH is preferable. When the DeNB PCFICH information is embedded in R-PDCCH, R-PDCCH starts assuming a fixed DeNB PCFICH for MBSFN subframes and another fixed DeNB PCFICH for non-MBSFN subframes, a fixed RN PCFICH for MBSFN subframes, and potentially the RN switching impact information (whether negligible or worth one symbol). Consequently, R-PDCCH always starts with a fixed symbol index, irrespective of the actual PCFICH values in DeNB and RN. R-PDSCH, on the other hand, for different RNs may start with different symbol indices. Therefore, in one DeNB, R-PDCCH and R-PDSCH for one RN may be aligned, but for another RN may be misaligned. And, in another aspect, the number of available symbols for R-PDCCH and R-PDSCH can be the same for some RNs, and different for other RNs in one DeNB.

In another aspect, note that for the case when the switching impact is negligible, the savings for R-PDSCH can be up to 2 symbols. The number of bits needed to convey the PCFICH from DeNB to RN is two to indicate the actual PCFICH value. In one example, the relaying node may share the impact information with DeNB using one-bit to indicate whether the impact is negligible or the impact is worth one-symbol. With such information, R-PDSCH starting symbol can be optimized correspondingly.

In another aspect, if RN PCFICH is known at a DeNB, for example by semi-static signaling, but DeNB PCFICH is not known at the RN, for non-MBSFN DeNB subframes, no savings are expected since the RN must assume the worst case. For MBSFN DeNB subframes, savings are possible for one selected case:

DeNB has four transmitters and M=2 is fixed
RN has one or two transmitters and N=1 and is informed to DeNB
R-PDSCH can start at the $3^{rd}$ control symbol (vs. the $4^{th}$ control symbol).

Figure 7:
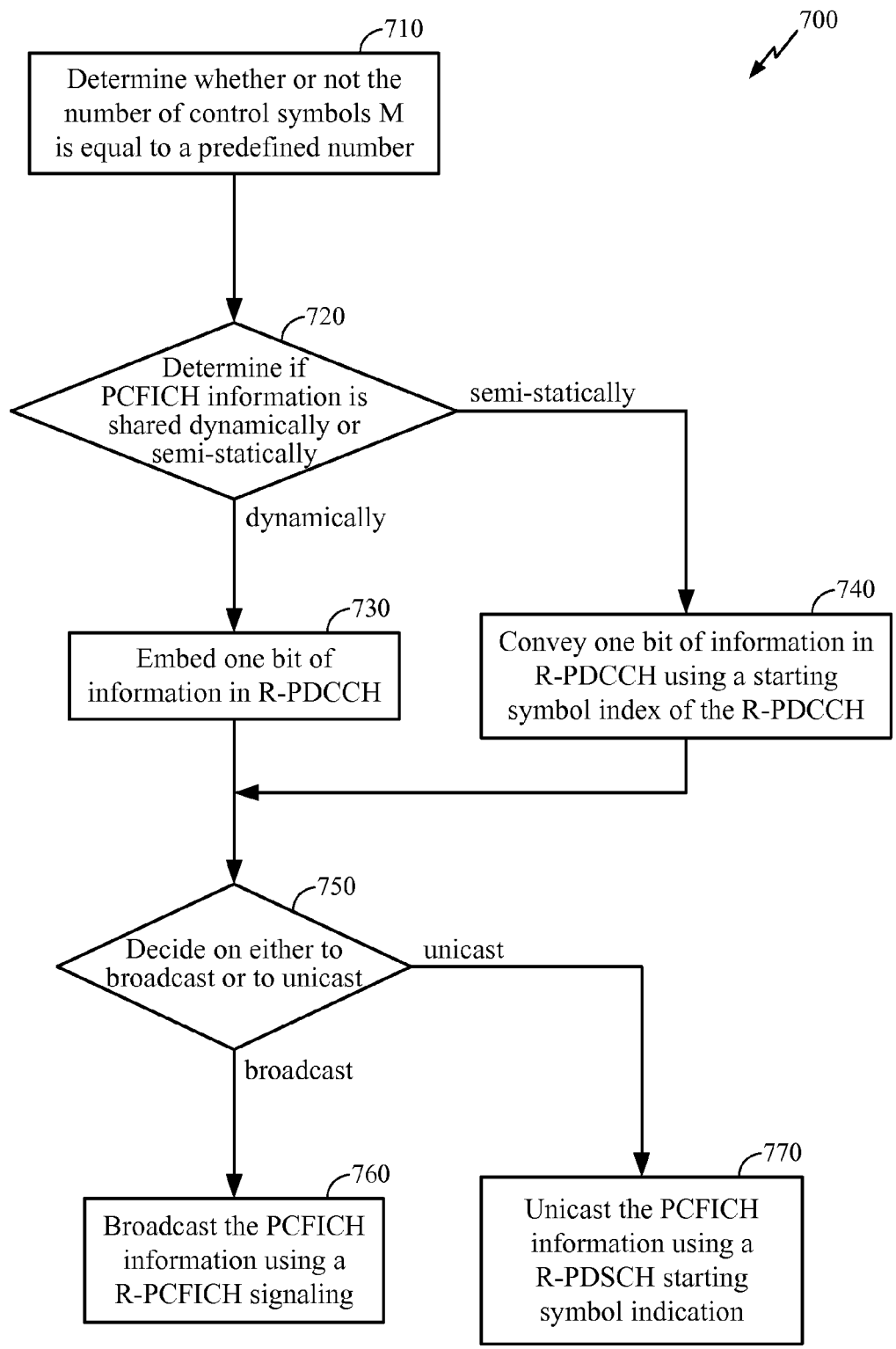
FIG. 7 illustrates an example of a flow diagram for Physical Control Format Indicator Channel (PCFICH) information sharing over a relay backhaul.

FIG. 7 illustrates an example of a flow diagram for Physical Control Format Indicator Channel (PCFICH) information sharing over a relay backhaul. In one example, the relay backhaul is part of a LTE-A wireless communication system. In one example, large bandwidths imply that more than 10 resource blocks (RBs) are used. In block 710, determine whether or not the number of control symbols M is equal to a predefined number. In one example, the predefined number is 3 for large bandwidths and 4 for small bandwidths. One skilled in the art would understand that the predefined number can be a number other than 3 for large bandwidths and other than 4 for small bandwidths. In one example, a large bandwidth is greater than 10 RBs and a small bandwidth is less than 10 RBs, such as between 6 to 10 RBs. In block 720, determine if PCFICH information is shared dynamically or semi-statically. In one example, the PCFICH information comprises 16 resource elements, each with 2 bit information (i.e., 32 bits total). In one example, the 2 bit information ranges from 1 to 3 for large bandwidths and 2 to 4 for small bandwidths.

If shared dynamically, proceed to block 730 to embed one bit of information in R-PDCCH. In one example, the embedded one bit of information indicates whether the number of control symbols M is equal to or less than 3 for large bandwidths or is equal to or less than 4 for small bandwidths. In one aspect, if shared dynamically, the sharing operates at layer 2.

If shared semi-statically, proceed to block 740 to convey one bit of information in R-PDCCH using a starting symbol index of the R-PDCCH. In one example, the conveyed one bit of information is conveyed in a fourth symbol of a starting symbol index of the R-PDCCH for a 0 bit for large bandwidths and in a third symbol of the starting symbol index of the R-PDCCH for a 1 bit for large bandwidths. In one example, the conveyed one bit of information is conveyed in a fifth symbol of the starting symbol index of the R-PDCCH for a 0 bit for small bandwidths and in a fourth symbol of the starting symbol index of the R-PDCCH for a 1 bit for small bandwidths. In one aspect, if shared semi-statically, the sharing operates at layer 3. In one example, the conveying of the one bit of information is performed with a cyclic redundancy check (CRC) masking, wherein the CRC masking is different for the 0 bit and the 1 bit.

Following either block 730 or block 740, proceed to block 750 and decide on either to broadcast or to unicast. If broadcast is decided, proceed to block 760 to broadcast the PCFICH information using a R-PCFICH signaling. If unicast is decided, proceed to block 770 to unicast the PCFICH information using a R-PDSCH starting symbol indication.

One skilled in the art would understand that the steps disclosed in the example flow diagram in FIG. 7 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, circuits, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, circuits, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 8:
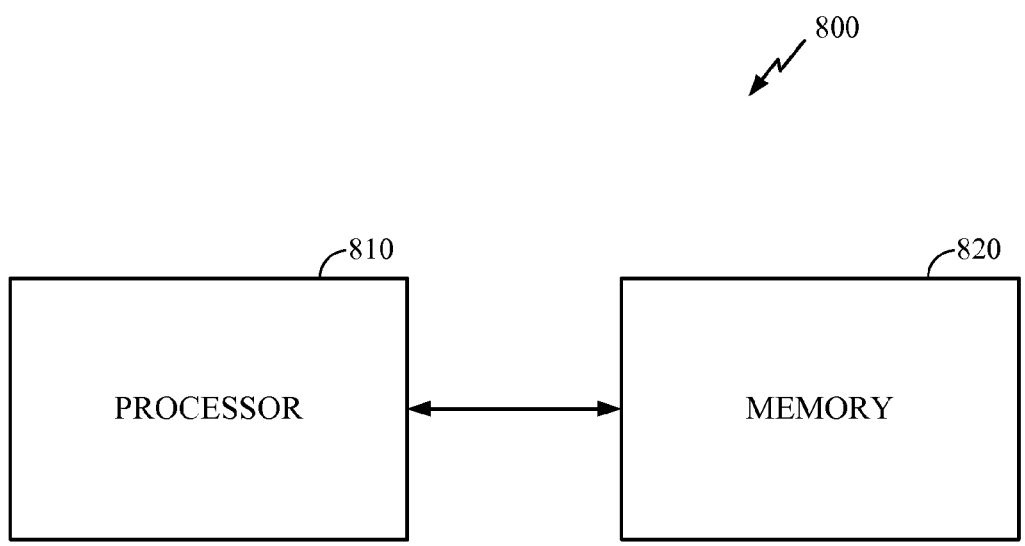
FIG. 8 illustrates an example of a device comprising a processor in communication with a memory for executing the processes for Physical Control Format Indicator Channel (PCFICH) information sharing over a relay backhaul.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 8 illustrates an example of a device 800 comprising a processor 810 in communication with a memory 820 for executing the processes for Physical Control Format Indicator Channel (PCFICH) information sharing over a relay backhaul or for communicating information in a relay downlink backhaul between a base station and at least one relay node. In one example, the device 800 is used to implement the algorithms illustrated in FIGS. 7 and 9. In one aspect, the memory 820 is located within the processor 810. In another aspect, the memory 820 is external to the processor 810. In one aspect, the processor includes circuitry for implementing or performing the various flow diagrams, logical blocks and/or modules described herein.

Figure 9:
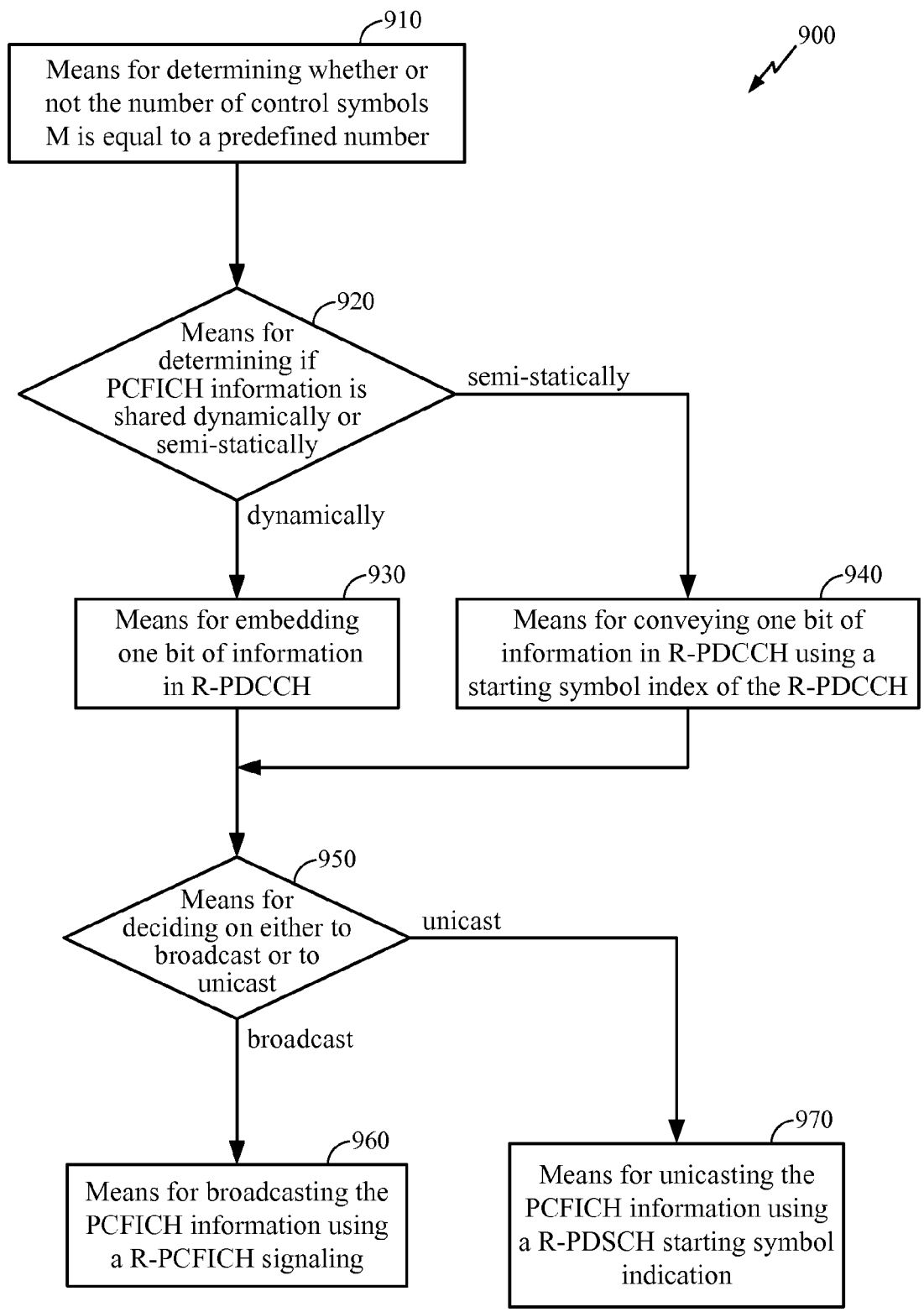
FIG. 9 illustrates an example of a device 900 suitable for Physical Control Format Indicator Channel (PCFICH) information sharing over a relay backhaul.

FIG. 9 illustrates an example of a device 900 suitable for Physical Control Format Indicator Channel (PCFICH) information sharing over a relay backhaul. In one aspect, the device 900 is implemented by at least one processor comprising one or more modules configured to provide different aspects of PCFICH information sharing over a relay backhaul as described herein in blocks 910, 920, 930, 940, 950, 960 and 970. For example, each module comprises hardware, firmware, software, or any combination thereof. In one aspect, the device 900 is also implemented by at least one memory in communication with the at least one processor.

Figure 10:
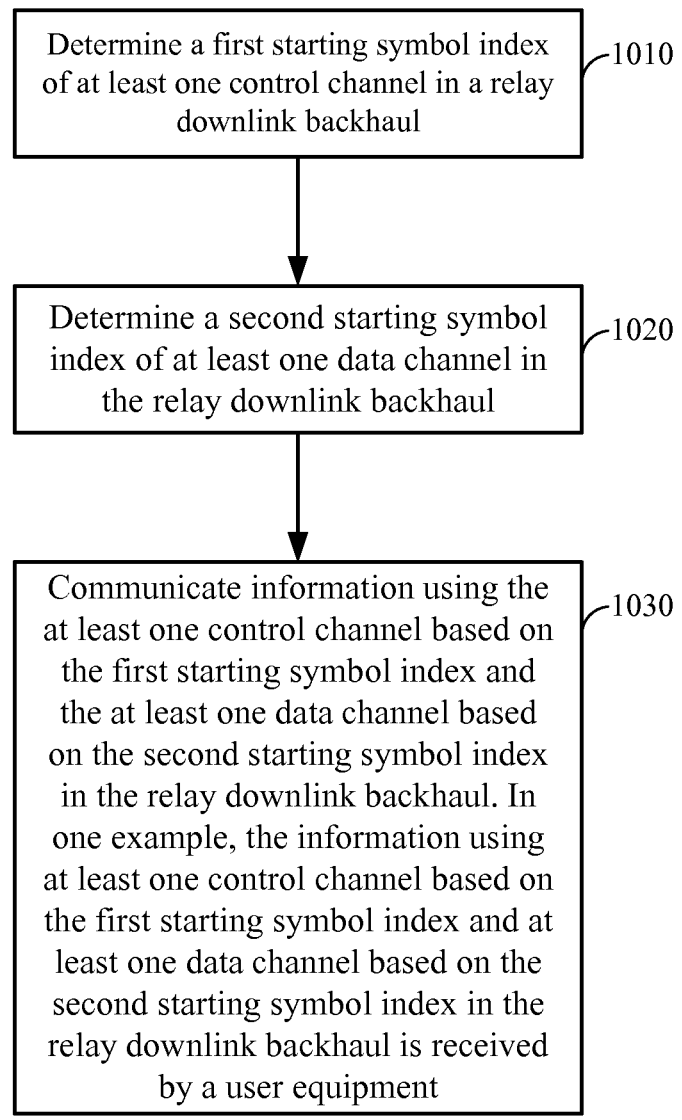
FIG. 10 illustrates an example of a flow diagram for communicating information in a relay downlink backhaul between a base station and at least one relay node.

FIG. 10 illustrates an example of a flow diagram for communicating information in a relay downlink backhaul between a base station and at least one relay node. In block 1010, determine a first starting symbol index of at least one control channel in the relay downlink backhaul. In one example, the first starting symbol index is fixed at a $4^{th}$ symbol of the at least one control channel. In one example, the first starting symbol index depends on a subframe type of the control channel at the base station. And, in one example, the subframe type is a MBSFN subframe. In block 1020, determine a second starting symbol index of at least one data channel in the relay downlink backhaul. In one example, the second starting symbol index is fixed on one of a $2^{nd}$ symbol, a $3^{rd}$ symbol, or a $4^{th}$ symbol of the at least one data channel. In one example, at least one of the first or second starting symbol index is configured semi-statically. In another example, at least one of the first or second starting symbol index is configured dynamically. In one example, at least one of the first or second starting symbol index depends on the number of transmit antennas on the at least one relay node. In another example, at least one of the first or second starting symbol index depends on the system bandwidth of the at least one relay node. In one example, either the first or the second starting symbol index is based on control region sizes of the base station and the at least one relay node. And, in one example, the control region sizes of the base station and the at least one relay node are shared semi-statically. In block 1030, communicate information using the at least one control channel based on the first starting symbol index and the at least one data channel based on the second starting symbol index in the relay downlink backhaul. In one example, the information using at least one control channel based on a first starting symbol index and at least one data channel based on a second starting symbol index in the relay downlink backhaul is received by a user equipment. In one example, the first starting symbol index is of the at least one control channel in the relay downlink backhaul and the second starting symbol index is of the at least one data channel in the relay downlink backhaul. In one example, the at least one relay node operates as half-duplex. In one example, at least one of the first or second starting symbol index depends on a transmit-to-receive switching time or a receive-to-transmit switching time of the at least one relay node. In one example, at least one of the transmit-to-receive switching time or the receive-to-transmit switching time of the at least one relay node is received by a eNodeB.

Figure 11:
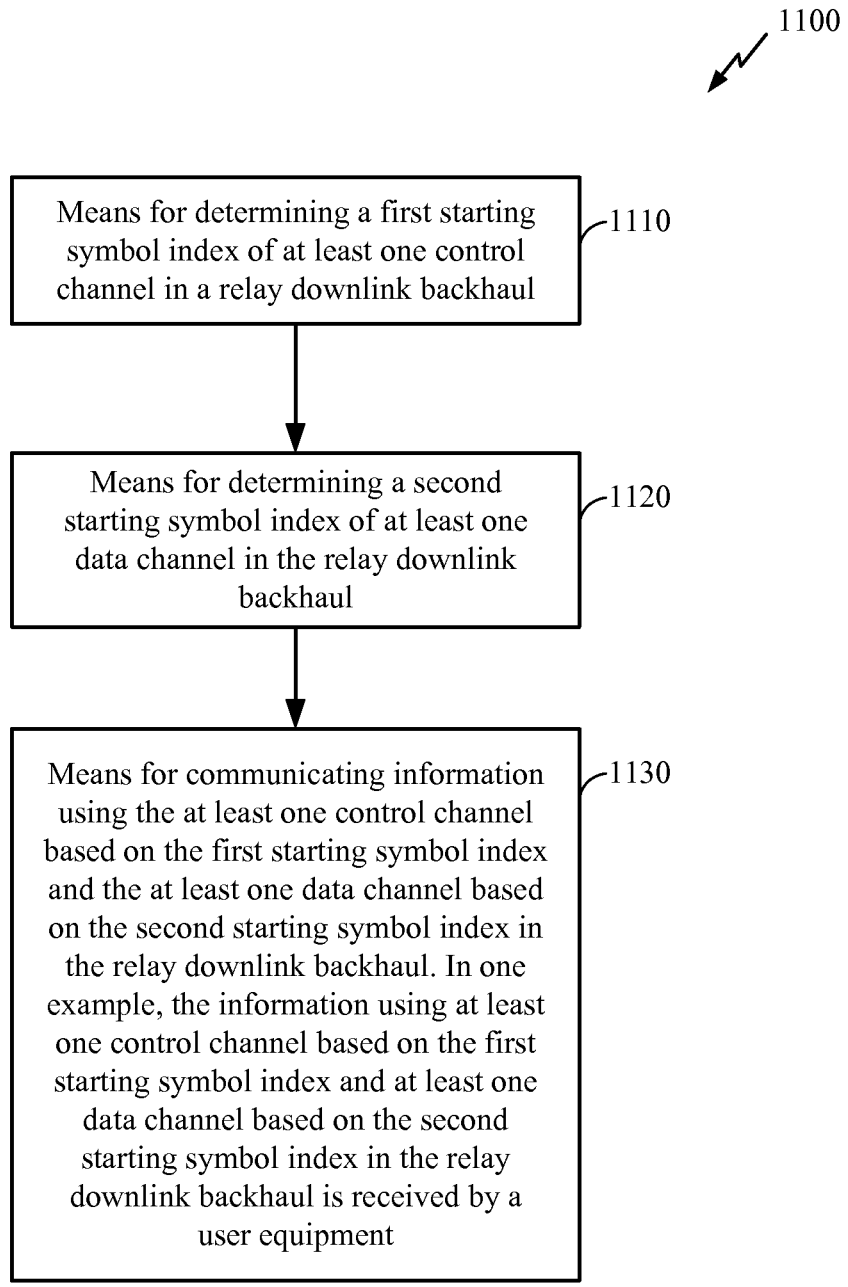
FIG. 11 illustrates an example of a device suitable for communicating information in a relay downlink backhaul between a base station and at least one relay node.

FIG. 11 illustrates an example of a device 1100 suitable for communicating information in a relay downlink backhaul between a base station and at least one relay node. In one aspect, the device 1100 is implemented by at least one processor comprising one or more modules configured to provide different aspects of communicating information in a relay downlink backhaul between a base station and at least one relay node as described herein in blocks 1110, 1120 and 1130. For example, each module comprises hardware, firmware, software, or any combination thereof. In one aspect, the device 1100 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for communicating information in a relay downlink backhaul between a base station and at least one relay node comprising:
   determining a first starting symbol index of at least one control channel in the relay downlink backhaul;
   determining a second starting symbol index of at least one data channel in the relay downlink backhaul; and
   communicating information using the at least one control channel based on the first starting symbol index and the at least one data channel based on the second starting symbol index in the relay downlink backhaul,
   wherein determining either the first or the second starting symbol index is based on control region sizes of the base station and the at least one relay node.

2. The method of claim 1, wherein the at least one relay node operates as half-duplex.

3. The method of claim 1, wherein at least one of the first or second starting symbol index depends on a transmit-to-receive switching time or a receive-to-transmit switching time of the at least one relay node.

4. The method of claim 3, further comprising receiving at least one of the transmit-to-receive switching time or the receive-to-transmit switching time of the at least one relay node.

5. The method of claim 1, wherein the control region sizes of the base station and the at least one relay node are shared semi-statically.

6. The method of claim 1, wherein the first starting symbol index is fixed at a $4^{th}$ symbol of the at least one control channel.

7. The method of claim 6, wherein the second starting symbol index is fixed on one of a $2^{nd}$ symbol, a $3^{rd}$ symbol, or a $4^{th}$ symbol of the at least one data channel.

8. The method of claim 7, wherein at least one of the first or second starting symbol index is configured semi-statically.

9. The method of claim 7, wherein at least one of the first or second starting symbol index is configured dynamically.

10. The method of claim 1, wherein the first starting symbol index depends on a subframe type of the at least one control channel at the base station.

11. The method of claim 10, wherein the subframe type is a MBSFN subframe.

12. The method of claim 1, wherein at least one of the first or second starting symbol index depends on the number of transmit antennas on the at least one relay node.

13. The method of claim 1, wherein at least one of the first or second starting symbol index depends on system bandwidth of the at least one relay node.

14. A method for communicating information in a relay downlink backhaul between a base station and at least one relay node comprising:
   receiving information using at least one control channel based on a first starting symbol index and at least one data channel based on a second starting symbol index in the relay downlink backhaul,
   wherein the first starting symbol index is of the at least one control channel in the relay downlink backhaul and the second starting symbol index is of the at least one data channel in the relay downlink backhaul,
   and wherein either the first or the second starting symbol index is based on control region sizes of the base station and the at least one relay node.

15. The method of claim 14, wherein at least one of the first or second starting symbol index depends on a transmit-to-receive switching time or a receive-to-transmit switching time of the at least one relay node.

16. An apparatus for communicating information in a relay downlink backhaul between a base station and at least one relay node, the apparatus comprising a processor and a memory with the memory containing program code executable by the processor for performing the following:
   determining a first starting symbol index of at least one control channel in the relay downlink backhaul;
   determining a second starting symbol index of at least one data channel in the relay downlink backhaul; and
   communicating information using the at least one control channel based on the first starting symbol index and the at least one data channel based on the second starting symbol index in the relay downlink backhaul,
   wherein determining either the first or the second starting symbol index is based on control region sizes of the base station and the at least one relay node.

17. The apparatus of claim 16, wherein the at least one relay node operates as half-duplex.

18. The apparatus of claim 16, wherein at least one of the first or second starting symbol index depends on a transmit-to-receive switching time or a receive-to-transmit switching time of the at least one relay node.

19. The apparatus of claim 18, further comprising receiving at least one of the transmit-to-receive switching time or the receive-to-transmit switching time of the at least one relay node.

20. The apparatus of claim 16, wherein the control region sizes of the base station and the at least one relay node are shared semi-statically.

21. The apparatus of claim 16, wherein the first starting symbol index is fixed at a $4^{th}$ symbol of the at least one control channel.

22. The apparatus of claim 21, wherein the second starting symbol index is fixed on one of a $2^{nd}$ symbol, a $3^{rd}$ symbol, or a $4^{th}$ symbol of the at least one data channel.

23. The apparatus of claim 22, wherein at least one of the first or second starting symbol index is configured semi-statically.

24. The apparatus of claim 22, wherein at least one of the first or second starting symbol index is configured dynamically.

25. The apparatus of claim 16, wherein the first starting symbol index depends on a subframe type of the at least one control channel at the base station.

26. The apparatus of claim 25, wherein the subframe type is a MBSFN subframe.

27. The apparatus of claim 16, wherein at least one of the first or second starting symbol index depends on the number of transmit antennas on the at least one relay node.

28. The apparatus of claim 16, wherein at least one of the first or second starting symbol index depends on system bandwidth of the at least one relay node.

29. An apparatus for communicating information in a relay downlink backhaul between a base station and at least one relay node, the apparatus comprising a processor and a memory with the memory containing program code executable by the processor for performing the following:
receiving information using at least one control channel based on a first starting symbol index and at least one data channel based on a second starting symbol index in the relay downlink backhaul,
wherein the first starting symbol index is of the at least one control channel in the relay downlink backhaul and the second starting symbol index is of the at least one data channel in the relay downlink backhaul,
and wherein either the first or the second starting symbol index is based on control region sizes of the base station and the at least one relay node.

30. The apparatus of claim 29, wherein at least one of the first or second starting symbol index depends on a transmit-to-receive switching time or a receive-to-transmit switching time of the at least one relay node.

31. An apparatus for communicating information in a relay downlink backhaul between a base station and at least one relay node comprising:
means for determining a first starting symbol index of at least one control channel in the relay downlink backhaul;
means for determining a second starting symbol index of at least one data channel in the relay downlink backhaul; and
means for communicating information using the at least one control channel based on the first starting symbol index and the at least one data channel based on the second starting symbol index in the relay downlink backhaul,
wherein the means for determining either the first or the second starting symbol index is based on control region sizes of the base station and the at least one relay node.

32. The apparatus of claim 31, wherein the at least one relay node operates as half-duplex.

33. The apparatus of claim 31, wherein at least one of the first or second starting symbol index depends on a transmit-to-receive switching time or a receive-to-transmit switching time of the at least one relay node.

34. The apparatus of claim 33, further comprising means for receiving at least one of the transmit-to-receive switching time or the receive-to-transmit switching time of the at least one relay node.

35. The apparatus of claim 31, wherein the control region sizes of the base station and the at least one relay node are shared semi-statically.

36. The apparatus of claim 31, wherein the first starting symbol index is fixed at a $4^{th}$ symbol of the at least one control channel.

37. The apparatus of claim 36, wherein the second starting symbol index is fixed on one of a $2^{nd}$ symbol, a $3^{rd}$ symbol, or a $4^{th}$ symbol of the at least one data channel.

38. The apparatus of claim 37, wherein at least one of the first or second starting symbol index is configured semi-statically.

39. The apparatus of claim 37, wherein at least one of the first or second starting symbol index is configured dynamically.

40. The apparatus of claim 31, wherein the first starting symbol index depends on a subframe type of the at least one control channel at the base station.

41. The apparatus of claim 40, wherein the subframe type is a MBSFN subframe.

42. The apparatus of claim 31, wherein at least one of the first or second starting symbol index depends on the number of transmit antennas on the at least one relay node.

43. The apparatus of claim 31, wherein at least one of the first or second starting symbol index depends on system bandwidth of the at least one relay node.

44. An apparatus for communicating information in a relay downlink backhaul between a base station and at least one relay node comprising:
means for receiving information using at least one control channel based on a first starting symbol index and at least one data channel based on a second starting symbol index in the relay downlink backhaul,
wherein the first starting symbol index is of the at least one control channel in the relay downlink backhaul and the second starting symbol index is of the at least one data channel in the relay downlink backhaul,
and wherein either the first or the second starting symbol index is based on control region sizes of the base station and the at least one relay node.

45. The apparatus of claim 44, wherein at least one of the first or second starting symbol index depends on a transmit-to-receive switching time or a receive-to-transmit switching time of the at least one relay node.

46. A non-transitory computer-readable medium storing a computer program for communicating information in a relay downlink backhaul between a base station and at least one relay node, wherein execution of the computer program is for:
determining a first starting symbol index of at least one control channel in the relay downlink backhaul;
determining a second starting symbol index of at least one data channel in the relay downlink backhaul; and
communicating information using the at least one control channel based on the first starting symbol index and the at least one data channel based on the second starting symbol index in the relay downlink backhaul,
wherein determining either the first or the second starting symbol index is based on control region sizes of the base station and the at least one relay node.

47. A non-transitory computer-readable medium storing a computer program for communicating information in a relay downlink backhaul between a base station and at least one relay node, wherein execution of the computer program is for:
- receiving information using at least one control channel based on a first starting symbol index and at least one data channel based on a second starting symbol index in the relay downlink backhaul,
- wherein the first starting symbol index is of the at least one control channel in the relay downlink backhaul and the second starting symbol index is of the at least one data channel in the relay downlink backhaul,
- and wherein either the first or the second starting symbol index is based on control region sizes of the base station and the at least one relay node.

* * * * *